United States Patent
Stefik

(10) Patent No.: US 8,190,424 B2
(45) Date of Patent: May 29, 2012

(54) COMPUTER-IMPLEMENTED SYSTEM AND METHOD FOR PROSPECTING DIGITAL INFORMATION THROUGH ONLINE SOCIAL COMMUNITIES

(75) Inventor: Mark Jeffrey Stefik, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/311,524

(22) Filed: Dec. 5, 2011

(65) Prior Publication Data

US 2012/0078960 A1  Mar. 29, 2012

Related U.S. Application Data

(63) Continuation of application No. 12/190,560, filed on Aug. 12, 2008, now Pat. No. 8,073,682.

(60) Provisional application No. 60/998,636, filed on Oct. 12, 2007.

(51) Int. Cl.
  *G06F 15/17* (2006.01)
  *G06F 17/27* (2006.01)
  *G10L 11/00* (2006.01)
  *G09B 9/22* (2006.01)

(52) U.S. Cl. ............ 704/9; 704/257; 704/270; 709/224; 707/999.003; 434/129

(58) Field of Classification Search .................... None
See application file for complete search history.

(56) References Cited

U.S. PATENT DOCUMENTS

| | | |
|---|---|---|
| 5,257,939 A | 11/1993 | Robinson et al. |
| 5,369,763 A | 11/1994 | Biles |
| 5,530,852 A | 6/1996 | Meske et al. |
| 5,671,342 A | 9/1997 | Millier et al. |
| 5,680,511 A | 10/1997 | Baker et al. |
| 5,724,567 A | 3/1998 | Rose et al. |
| 5,784,608 A | 7/1998 | Meske et al. |
| 5,907,677 A | 5/1999 | Glenn et al. |

(Continued)

FOREIGN PATENT DOCUMENTS

EP  1571579  9/2005

(Continued)

OTHER PUBLICATIONS

C. Anderson, "The Long Tail: Why the Future of Business is Selling Less of More," 2006, Chapter 1, pp. 1-26, Hyperion Press, New York (2006).

(Continued)

*Primary Examiner* — Justin Rider
(74) *Attorney, Agent, or Firm* — Patrick J. S. Inouye; Krista A. Wittman

(57) ABSTRACT

A home evergreen index and frontier evergreen indexes are maintained. The indexes cover topically-limited subject areas, which include digital information. Each index defines a hierarchy of topics. Each index further matches a topic model to the topic hierarchy's topics. Each topic model includes a pattern evaluable against the digital information, which identifies such digital information matching the topic model's topic. At least one frontier evergreen index that includes topics that are at least partially distinct from the topics included in the home evergreen index is identified. Vetted assessments for articles identified by the at least one frontier evergreen index are obtained. The articles corresponding to the vetted assessments that are favorable are selected. The patterns that include the topic models of the home evergreen index are matched against the selected articles of the digital information. The selected articles of the digital information that were matched are provided on a display.

21 Claims, 11 Drawing Sheets

U.S. PATENT DOCUMENTS

| | | | |
|---|---|---|---|
| 5,907,836 | A | 5/1999 | Sumita et al. |
| 5,953,732 | A | 9/1999 | Meske et al. |
| 6,021,403 | A | 2/2000 | Horvitz et al. |
| 6,052,657 | A | 4/2000 | Yamron et al. |
| 6,064,952 | A | 5/2000 | Imanaka et al. |
| 6,233,570 | B1 | 5/2001 | Horvitz et al. |
| 6,233,575 | B1 | 5/2001 | Agrawal et al. |
| 6,240,378 | B1 | 5/2001 | Imanaka et al. |
| 6,247,002 | B1 | 6/2001 | Steels |
| 6,269,361 | B1 | 7/2001 | Davis et al. |
| 6,285,987 | B1 | 9/2001 | Roth et al. |
| 6,292,830 | B1 | 9/2001 | Taylor et al. |
| 6,397,211 | B1 | 5/2002 | Cooper |
| 6,598,045 | B2 | 7/2003 | Light et al. |
| 6,772,120 | B1 | 8/2004 | Moreno et al. |
| 6,804,688 | B2 | 10/2004 | Kobayashi et al. |
| 6,981,040 | B1 | 12/2005 | Konig et al. |
| 7,062,485 | B1 | 6/2006 | Jin et al. |
| 7,092,888 | B1 | 8/2006 | McCarthy et al. |
| 7,200,606 | B2 | 4/2007 | Elkan |
| 7,275,061 | B1 | 9/2007 | Kon et al. |
| 7,281,022 | B2 | 10/2007 | Gruhl et al. |
| 7,293,019 | B2 | 11/2007 | Dumais et al. |
| 7,320,000 | B2 | 1/2008 | Chitrapura et al. |
| 7,426,557 | B2 | 9/2008 | Gruhl et al. |
| 7,467,202 | B2 | 12/2008 | Savchuk |
| 7,496,567 | B1 | 2/2009 | Steichen |
| 7,548,917 | B2 | 6/2009 | Nelson |
| 7,567,959 | B2 | 7/2009 | Patterson |
| 7,600,017 | B2 | 10/2009 | Holtzman et al. |
| 7,685,224 | B2 | 3/2010 | Nye |
| 7,707,206 | B2 | 4/2010 | Encina et al. |
| 7,747,593 | B2 | 6/2010 | Patterson et al. |
| 7,809,723 | B2 | 10/2010 | Liu et al. |
| 7,890,485 | B2 | 2/2011 | Malandain et al. |
| 2002/0161838 | A1 | 10/2002 | Pickover et al. |
| 2004/0059708 | A1 | 3/2004 | Dean et al. |
| 2005/0097436 | A1 | 5/2005 | Kawatani |
| 2005/0226511 | A1 | 10/2005 | Short |
| 2005/0278293 | A1 | 12/2005 | Imachi et al. |
| 2006/0167930 | A1 | 7/2006 | Witwer et al. |
| 2007/0050356 | A1 | 3/2007 | Amadio |
| 2007/0156622 | A1 | 7/2007 | Akkiraju et al. |
| 2007/0214097 | A1 | 9/2007 | Parsons et al. |
| 2007/0239530 | A1 | 10/2007 | Datar et al. |
| 2007/0244690 | A1 | 10/2007 | Peters |
| 2007/0260508 | A1 | 11/2007 | Barry et al. |
| 2007/0260564 | A1 | 11/2007 | Peters et al. |
| 2007/0271086 | A1 | 11/2007 | Peters et al. |
| 2008/0040221 | A1 | 2/2008 | Wiseman et al. |
| 2008/0065600 | A1 | 3/2008 | Batteram et al. |
| 2008/0126319 | A1 | 5/2008 | Bukai et al. |
| 2008/0133482 | A1 | 6/2008 | Anick et al. |
| 2008/0201130 | A1 | 8/2008 | Peters et al. |
| 2008/0307326 | A1 | 12/2008 | Gruhl et al. |
| 2010/0070485 | A1 | 3/2010 | Parson et al. |
| 2010/0114561 | A1 | 5/2010 | Yasin |

FOREIGN PATENT DOCUMENTS

| | | |
|---|---|---|
| WO | 2005073881 | 8/2005 |
| WO | 2007047903 | 4/2007 |

OTHER PUBLICATIONS

A. Agarval, "How Google News works". http://labnol.blogspot.com/2005/05/how-google-news-works.html (2005).

Akiko Aizawa, "An Information-Theoretic Perspective of TF-IDF Measures," Information Processing and Management, Elsevier Science Ltd., vol. 39, No. 1, pp. 45-65 (Jan. 1, 2003).

Anonymous "TF-IDF," Wikipedia, the free encyclopedia (Jul. 23, 2007).

Arampatzis et al., "An Evaluation of Linguistically-Motivated Indexing Schemes," 2000, Proceedings of the BCSIRSG (2000).

Arasu et al., "Searching The Web," ACM, New York, NY, US, pp. 2-43 (Aug. 1, 2001).

Biebricher et al., "The Automatic Indexing System AIR/PHYS—1997, From Research to Application," In Readings in Information Retrieval, Morgan Kaufmann Publishers, San Francisco (1997).

Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).

Brin et al., "The Anatomy of a Large-Scale Hypertextual Web Search Engine," Paper presented at the Seventh International Conference on World Wide Web. Apr. 14-18, 1998, Brisbane, Australia (1998).

R. D. Burt, "Structural Holes and Good Ideas," American Journal of Sociology, vol. 110, No. 2, pp. 349-399 (2003).

Card et al., "Readings in Information Visualization: Using Vision to Think," 1999, Section 3 Interaction, pp. 231-259, 295-306, Morgan Kaufmann Publishers, San Francisco (1999).

Chi et al., "EBooks With Indexes that Reorganize Conceptually," Paper presented at Human Factors in Computing Systems Conference Apr. 24-29, 2004, Vienna, Austria (2004).

J. Dowdell, "Digg Algorithm for Scoring Stories," Marketing Shift, www.marketingshift.com/2006/9/diggs-algorithm-elements-confirmed.cfm (Sep. 8, 2006).

J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm (Sep. 7, 2006).

G. W. Furnas, "Generalized Fisheye Views," Paper presented at the Conference on Human Factors in Computing Systems, 1986, Boston, Massachusetts (1986).

Haav et al., "A Survey of Concept-Based Information Retrieval Tools on the Web," http://greta.cs.ioc.ee/~helemai/HaavLubiADBIS2001.pdf (2001).

M. Helft, "How a Series of Mistakes Hurt Shares of United". New York Times. http://www.nytimes.com/2008/09/15/technology/15google.html?_r=1 (Sep. 15, 2008).

C. Holahan, "So Many Ads, So Few Clicks," BusinessWeek, p. 38 (Nov. 12, 2007).

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2 (1997).

Kusek et al., "The Future of Music: Manifesto for the Digital Music Revolution," 2005, pp. 154-156, Boston: Berklee Press.

P. Lenssen, "How Google News Indexes". See http://blogoscoped.com/archive/2006-07-28-n49.html (2006).

C. Mezei, "The Digg Algorithm-Unofficial FAQ," SeoPedia, www.secopedia.org/tips-tricks/social-media/the-digg-algorithm-unofficial-faq (Nov. 2, 2006).

G. A. Miller, "The Magical Number Seven, Plus or Minus Two: Some Limits on Our Capacuty for Processing Information," Psychological Review, vol. 63, pp. 81-97 (1956).

Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).

N. Patel, "There's More to Digg Than Meets the Eye," Pronet Advertising, www.pronetadvertising.com/articles/theres-more-to-digg-than-meets-the-eye.html (Jan. 15, 2007).

P. Pirolli, "Information Foraging Theory: Adaptive Interaction with Information," 2007, pp. 1-29, 39-43, 48-67, 183-192, Oxford: Oxford University Press (2007).

J. Preston, "Why Google News works." http://eatsleeppublish.com/why-google-news-works/, published Aug. 29, 2008.

Rajashekar et al., "Combining Automatic and Manual Index Representations in Probabilistic Retrieval," Journal of the American Society for Information Science, vol. 46, iss. 4, pp. 272-283 (1995).

Rocha L. M., "Adaptive Webs for Heterarchies With Diverse Communities of Users," Workshop From Intelligent Networks to the Global Brain: Evolutionary Technology, pp. 1-35 (Jul. 3, 2001).

G. Sacco, "Dynamic Taxonomies and Guided Searches," Journal of the American Society for Information Science and Technology, vol. 57, Issue 6 (Apr. 2006).

Schutze H., "The Hypertext Concordance: A Better Back-of-the-Book Index," 1998, Proceedings of Workshop on Computational Technology, pp. 101-104, Montreal, Canada (1998).

Wikipedia, the Free Encyclopedia, "Google News". http://en.wikipedia.org/wiki/Google_News, accessed Apr. 30, 2009.

Yu et al, "PEBL: Positive Example Based Learning for Web Page Classification Using SVM," Proc. of ACM SIGKDD International Conference on Knowledge Discovery and Data Mining (2002).

H. Simon, "Designing Organizations for an Information-Rich World." In Communications and the Public Interest, ed. Martin Greenberger. 37-72. The Johns Hopkins Press (1971).

COMPUTER-IMPLEMENTED SYSTEM AND METHOD FOR PROSPECTING DIGITAL INFORMATION THROUGH ONLINE SOCIAL COMMUNITIES

CROSS-REFERENCE TO RELATED APPLICATION

This patent application is a continuation of U.S. patent application Ser. No. 12/190,560, filed Aug. 12, 2008, pending, which claims priority from U.S. Provisional Patent Application Ser. No. 60/998,636, filed Oct. 12, 2007, the priority filing dates of which are claimed, and the disclosures of which are incorporated by reference.

FIELD

This application relates in general to digital information sensemaking and, in particular, to a computer-implemented system and method for prospecting digital information through online social communities.

BACKGROUND

Digital sensemaking is sensemaking mediated by a digital information infrastructure, such as the Worldwide Web ("Web"). Through the Web, users can access both "traditional" Web sites that post information from diverse sources and interactive Web sites, including moderated Web logs or "blogs," user forums, and Web sites with voting, which allow users to actively rank new information.

As a digital information repository, the Web continually evolves as events occur, ideas get synthesized, and new trends emerge. New information is posted continuously. Information awareness, though, remains artificially constrained. Mainstream media Web sites generally only cover popular topics, such as news, business, politics, sports, entertainment, and weather, but a host of additional topics exist through other Web sources, which may fall outside the scope of a reader's, or publisher's, core set of interests. These topics range from slightly less popular topics, for instance, technology news, to specialized or obscure topics that are relevant to a comparatively small number of people, such as evening class schedules for a local community college.

The demand for items in many markets follows a "Long Tail" distribution, such as described in C. Anderson, *The Long Tail: Why the Future of Business is Selling Less of More*, (Hyperion Press) (2006), the disclosure of which is incorporated by reference. FIG. 1 is a graph showing, by way of example, a hypothetical long tail distribution 10 for digital information. The x-axis represents digital information and the y-axis represents popularity level. Items appearing at the head of the distribution 11, although few in number, enjoy the greatest popularity, such as media stories falling into a small number of popular categories. However, items along the "long tail" 12, which cover niche topics with smaller readerships, outnumber head items 11. Although any single head item 11 enjoys greater popularity than any one of the long tail items 12, the aggregate popularity of a large enough group of long tail items 12 will exceed the popularity of all head items 11 when enough long tail items 12 are included, which implies that a larger overall audience could be reached by focusing on long tail topics, provided the audience can be made aware of them.

Consumers of information have only a limited amount of time and cannot pay attention to everything. As more topics become available, mainstream topics receive a shrinking fraction of readers' attention. Analogously, prime time television audiences are currently shrinking, as cable and satellite networks improve their programming and increase their viewership. Similarly, musical "hits" today sell fewer copies than sold a decade ago, as more choices and purchasing options become available. The economics and popularity trends from these observations can be succinctly summarized: "if you give people choices, they take them" and "the head of the distribution is shrinking."

The problem is not only finding new or popular information: the problem is finding new information falling outside areas of core topical interests that nevertheless remain relevant while simultaneously pushing the envelope. Myopia sets in easily and focusing on only familiar and known topics risks missing new ideas or emerging trends. The amount of information on the "frontier" of a reader's core set of topics is larger than the body of information in main focus. Moreover, fringe topics are generally less important to the reader than the core topics, and are thus more easily overlooked.

Topics that will become important to readers often make their first appearance just beyond the boundaries of their familiar core topics. Monitoring topics on this fringe can give "beyond the radar" awareness of what's coming, potentially saving the expense of late remedies if attention is paid to the information much later. Efficiently finding relevant frontier information, though, can be a challenge, as the level of expertise is inherently lower than possessed for identifying core topical information. This problem is exacerbated by an incomplete understanding of the frontier information topics structure and a lack of awareness in identifying good sources of frontier information.

Therefore, a need remains in digital sensemaking for efficiently prospecting new, relevant, and authoritative digital information lying beyond the core topics for a specific subject area.

SUMMARY

A computer-implemented system and method for prospecting digital information through online social communities provides what's new, what's true, and what matters. "What's new" generally refers to information about current events, but in another sense, "what's new" includes new topics to which we are not yet attending. Such topics of emerging interest often come from the frontier. "What's true" means information from multiple "frontier" sources has already been socially vetted to establish level of interest and authoritativeness. "What matters" means that information is automatically categorized according to important topics in a reader's subject area.

New and relevant digital information is discovered by a reader's "home," that is, usual frontier community and by neighboring frontier communities. Each community of readers discovers information by utilizing fine-grained topical indexes shepharded by knowledge domain experts, the "hard work of the few;" by aggregating rankings and suggestions about better categorizing by a large community of users, "the light work of the many" or "the wisdom of crowds;" and by extending the topical indexes though machine-assisted learning, the "tireless work of the machines." Each augmented community has an evergreen index, which includes topic models, such as patterns, for each topic and subtopic that can be used to test whether given material is on point. The term "evergreen" is intended to connote a quality of freshness and currency for an index, so that new articles will be classified automatically and added to the index when they appear and that new topics can be added to the index as needed.

Digital information is prospected from the perspective of a given or "home" augmented community of a reader. One or more augmented communities on the information "frontier" of the home augmented community are first identified, either through knowledge-domain expertise or through automated suggestion of candidate frontier communities. The degree of interest assigned to articles appearing under the frontier augmented community's evergreen index is determined as an initial estimate of the relevancy the frontier information may have under the augmented community's evergreen index. The more promising articles of frontier information are then combined under the augmented community's evergreen index for collective vetting, along with articles already directly vetted under the index.

One embodiment provides a computer-implemented system and method for prospecting digital information through online social communities through online social communities. A home evergreen index for a home community and a plurality of frontier evergreen indexes for respective frontier communities are maintained. The home evergreen index and the frontier evergreen indexes cover topically-limited subject areas. Each of the subject areas include electronically-stored digital information. The home evergreen index and each frontier evergreen index define a hierarchy of stored topics. The home evergreen index and each frontier evergreen index further match a stored topic model to each of the topics in the topic hierarchy. Each of the topic models includes a pattern evaluable against the digital information, wherein the pattern identifies such digital information matching the topic model's topic. At least one frontier evergreen index that includes stored topics that are at least partially distinct from the stored topics included in the home evergreen index is identified. Vetted assessments as provided by the frontier community of the at least one frontier evergreen index for articles of the digital information identified by the patterns that comprise the topic models of the at least one frontier evergreen index are obtained. The articles of the digital information corresponding to the vetted assessments that are favorable are selected. The patterns that include the topic models of the home evergreen index are matched against the selected articles of the digital information. The selected articles of the digital information that were matched are provided on a display.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Figure 1:
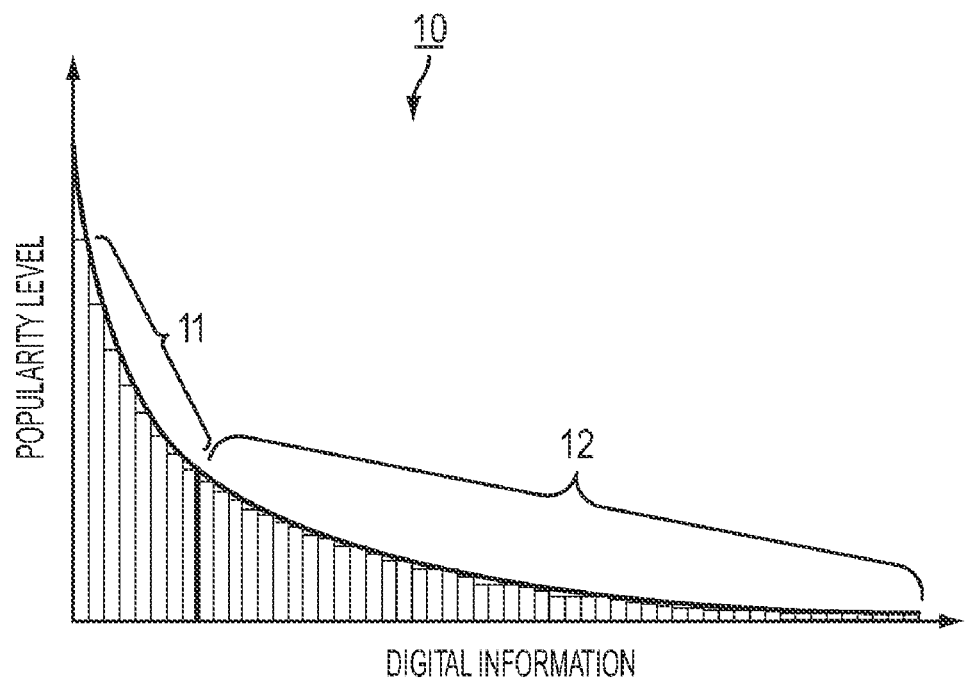
FIG. 1 is a graph showing, by way of example, a hypothetical long tail distribution for digital information.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a topic model and the set of pages contains all of the pages that match the topic model. A cited page can also be smaller than an entire page, such as a paragraph, which can be matched by a topic model.

Subject Area: The set of topics and subtopics in a social index, including an evergreen index.

Topic: A single entry within a social index. In an evergreen index, a topic is accompanied by a topic model, such as a pattern, that is used to match documents within a corpus.

Subtopic: A single entry hierarchically listed under a topic within a social index. In an evergreen index, a subtopic is also accompanied by a topic model.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Sensemaking

Figure 2:
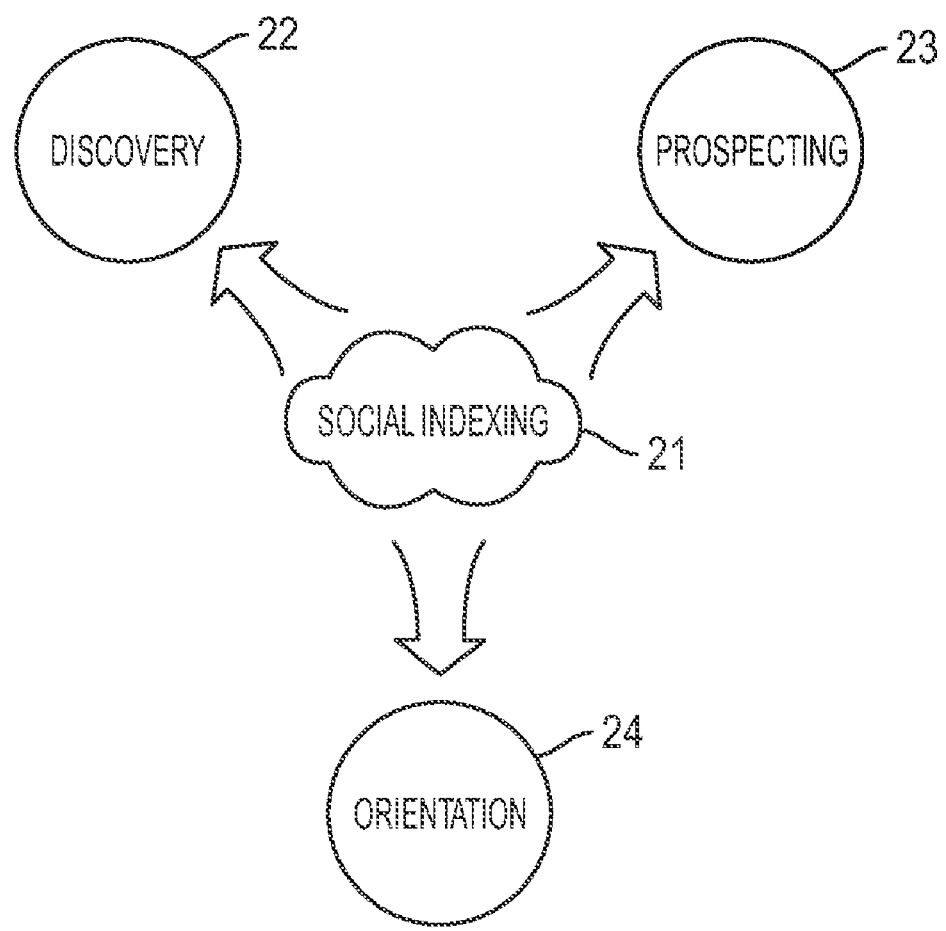
FIG. 2 is a functional block diagram showing challenges in digital sensemaking.

The Web and other online information resources provide an ever-evolving and expanding source of digital information. Digital sensemaking is about making sense out of the information in these resources. FIG. 2 is a functional block diagram 20 showing challenges in social indexing 21: digital information discovery 22, prospecting 23, and orientation 24. Other challenges are possible. These challenges represent different facets of information foraging, which work synergistically to provide new, relevant, and authoritative digital information through a topically fine-grained and socially-vetted infrastructure. Each challenge will now be summarized.

Digital information discovery 22 focuses on identifying new and topically-relevant information for a set of core interests, as further described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference. Digital information discovery begins with the premise that each person has a set of core interests with a need for information spanning multiple topics within the core interests, including long tail topics, with varying levels of importance. The key challenge is in efficiently tracking new information on the core interests.

Figure 7:
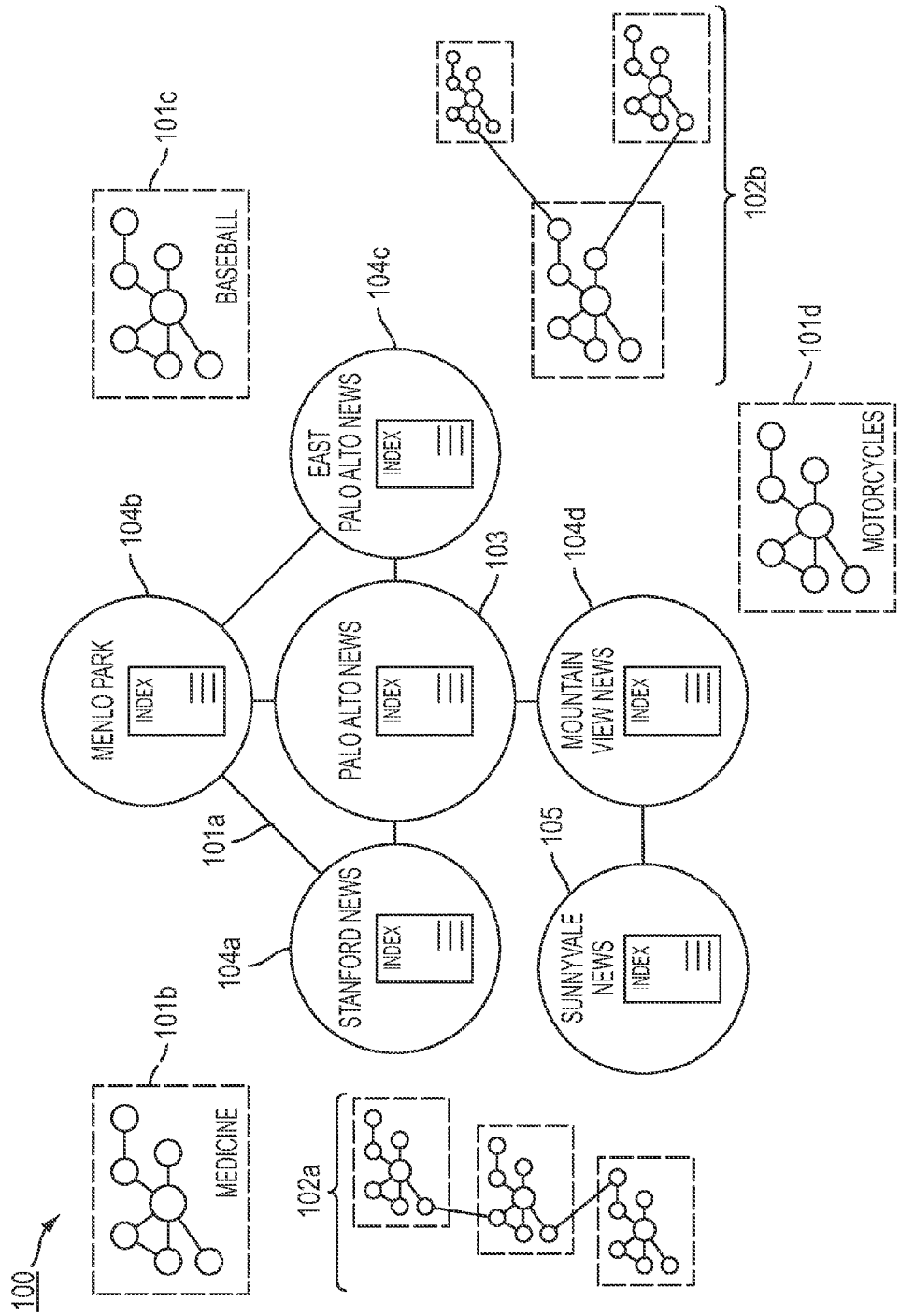
FIG. 7 is a block diagram showing, by way of example, neighborhoods of augmented communities.

Digital information prospecting 23, the focal point of this application, focuses on foraging or mining an individual's information frontier as an aid to idea synthesis, as further described below beginning with reference to FIG. 7. Information prospecting expands an individual's information diet beyond existing interests, as fundamentally satisfied through digital information discovery 22, by tapping into a social network of communities. For example, information frontiers for local news includes news from neighboring towns and cities. As another example, information frontiers for a professional interest, such as family dentistry, potentially includes relevant topics from related fields, for instance, dental hygiene, new dental materials, and perhaps new antibiotics or results from cosmetic dentistry. Digital information prospecting facilitates efficient attention allocation without risking the distractions or inefficiencies in covering uncharted new topical ground. The key challenge is in finding the most relevant information from neighboring subject areas along the frontier.

Finally, digital information orientation 24 is about becoming oriented to an unfamiliar subject area, as further described in commonly-assigned U.S. patent application, entitled "System and Method for Providing Orientation into Digital Information," Ser. No. 12/190,557, filed Aug. 12, 2008, pending, the disclosure of which is incorporated by reference. Digital information orientation is about efficiently gaining an understanding of a new subject area. This activity is complementary to information discovery and prospecting information frontiers, reflecting the case where the objective is to explore an area to learn about the subject matter generally. The activity includes learning the topic structure and main results, as well as identifying good references.

Digital Information Sensemaking Environment

Figure 3:
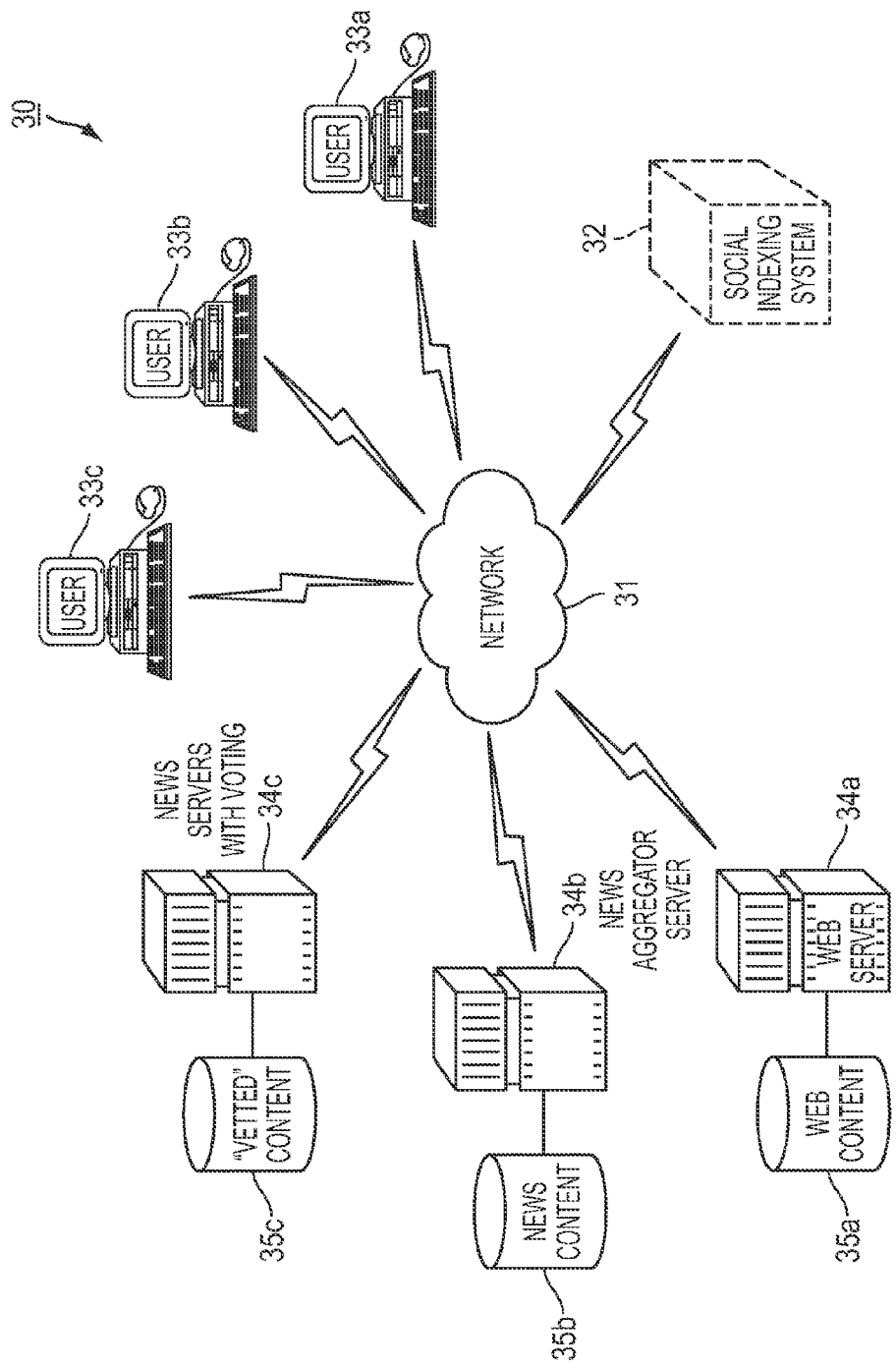
FIG. 3 is a block diagram showing an exemplary environment for digital information sensemaking.

Digital sensemaking is sensemaking mediated by a digital information infrastructure, which includes public data networks, such as the Internet, standalone computer systems, and various repositories of digital information. FIG. 3 is a block diagram showing an exemplary environment 30 for digital information sensemaking. The same basic system components are utilized for digital information discovery 22, prospecting 23, and orientation 24.

Digital information is information available in digital form. A digital data communications network 31, such as the Internet, provides a suitable digital information exchange infrastructure, although other infrastructures are possible, for instance, a non-public corporate enterprise network. The network 31 provides interconnectivity to various information sources and information consumers that respectively provide and access the digital information. Web servers 34a, news aggregator servers 34b, news servers with voting 34c, and other digital information repositories serve as information sources. These sources respectively serve Web content 35a, news content 35b, community-voted or "vetted" content 35c, and other digital information to user devices 33a-c, such as personal computers and similar devices, that function as the information consumers.

In general, each user device 33a-c is a Web-enabled device that executes a Web browser or similar application, which supports interfacing to and information exchange with the servers 34a-c. Both the user devices 33a-c and servers 34a-c include components conventionally found in general purpose programmable computing devices, such as a central processing unit, memory, input/output ports, network interfaces, and non-volatile storage, although other components are possible. Moreover, other information sources in lieu of or in addition to the servers 34a-c, and other information consumers, in lieu of or in addition to user devices 33a-c, are possible.

Digital sensemaking and, in particular, digital information prospecting 23, is facilitated by a social indexing system 32, which is also interconnected to the information sources and the information consumers via the network 31. The social indexing system 32 facilitates the automated prospecting of digital information from frontier augmented communities with relation to core topics within a reader's subject area.

Social Indexing System

Figure 4:
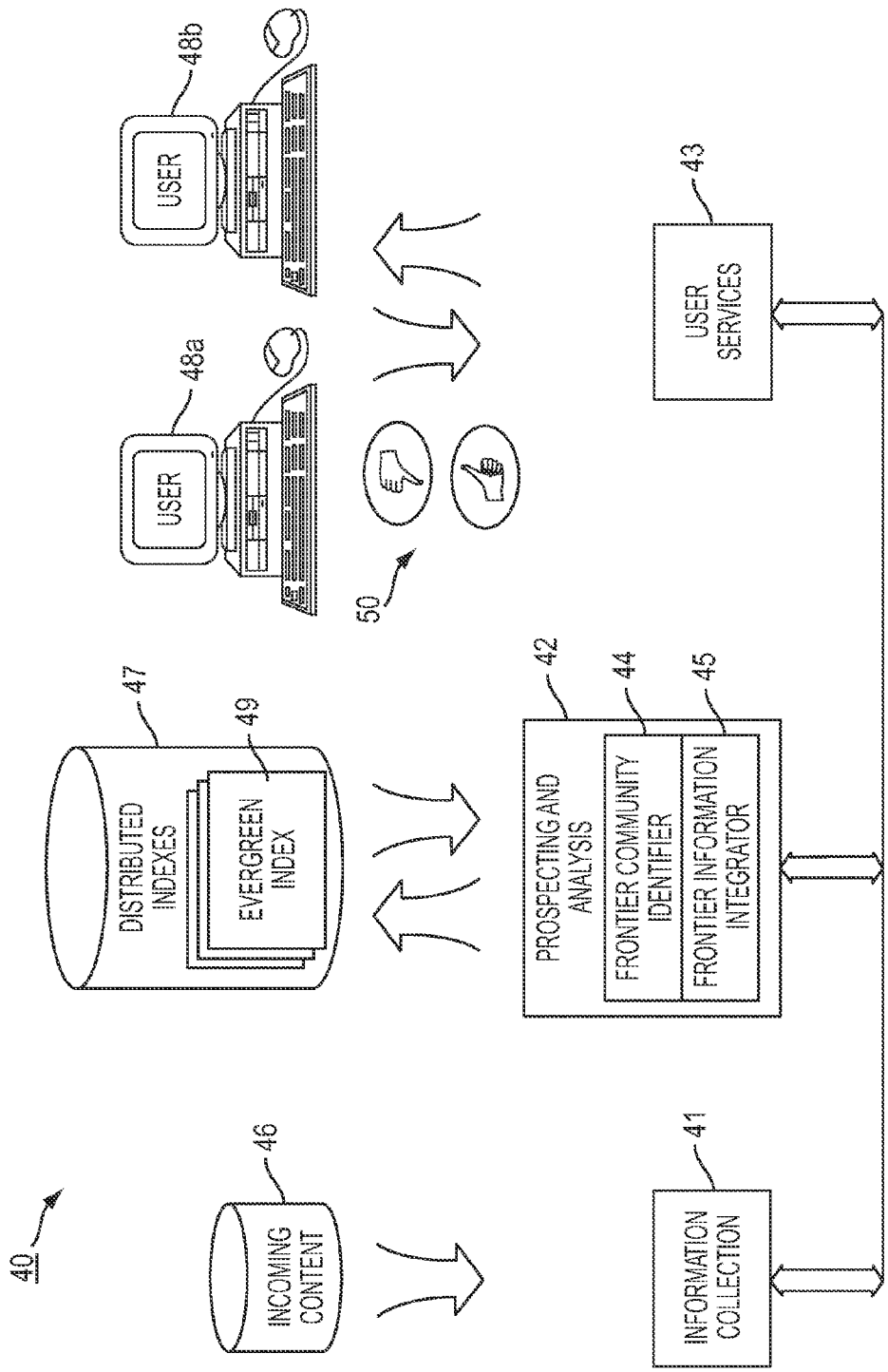
FIG. 4 is a functional block diagram showing principal components used in the social indexing system of FIG. 3.

From a user's point of view, the social indexing system appears as a single information portal, but is actually a set of services provided by an integrated digital information processing environment. FIG. 4 is a functional block diagram showing principal components 40 used in the social indexing system 32 of FIG. 3. The components are focused on digital information prospecting and other components may be used to provide digital information discovery, orientation, degree of interest, and other services.

The components 40 can loosely be grouped into three functional areas, information collection 41, prospecting and analysis 42, and user services 43, although other functional areas are possible. The functional groups are interconnected and interdependent and can be implemented on the same or separate computational platforms. Information collection 41 obtains incoming content 46, such as Web content 35a, news content 35b, and "vetted" content 35c, from information sources, including Web servers 34a, news aggregator servers 34b, and news servers with voting 34c. The information sources include feeds and sources providing content to both a home augmented community, as well as select neighboring frontier communities from whom information has been prospected. The incoming content 46 is collected by a media collector operating under the direction of a scheduler to periodically or on-demand harvest new information from the information sources. The incoming content 46 can be stored in structured repository, or indirectly stored by saving only references or citations to the incoming content in lieu of maintaining an actual copy of the incoming content locally, such as storing hyperlinks.

Prospecting and analysis 42 tracks information not of core interest and effectively diverts a percentage of the reader's attention to frontier news. A frontier community identifier 44 locates those neighboring augmented communities that lie on the "frontier" of an augmented community's core subject areas, and identifies their information sources to information collection 41, as further described below with reference to FIG. 9. The frontier information integrator 45 thereafter determines a degree of interest that is used in ranking articles received from the frontier communities and relates collected frontier information to topics and sub-topics appearing in the augmented community's evergreen index, as further described below with reference to FIGS. 10 and 11.

Finally, user services 43 provide a front-end to users 48a-b to access the distributed indexes 47 and the incoming content 46. Each evergreen index 49 is tied to a community of users, known as an "augmented" community, which has an ongoing interest in a core subject area. The community "vets" information cited by voting 50 within the topic to which the information has been assigned, as further discussed below beginning with FIG. 12.

Digital Information Discovery

An information "diet" characterizes what information a user consumes across subjects of special interest, as well as select content from frontier augmented communities. The diet also reflects the amount of time that the user is willing to allocate to "digesting" each subject. Digital information prospecting contributes to the first aspect of a diet, information in subjects of special interest.

Figure 5:
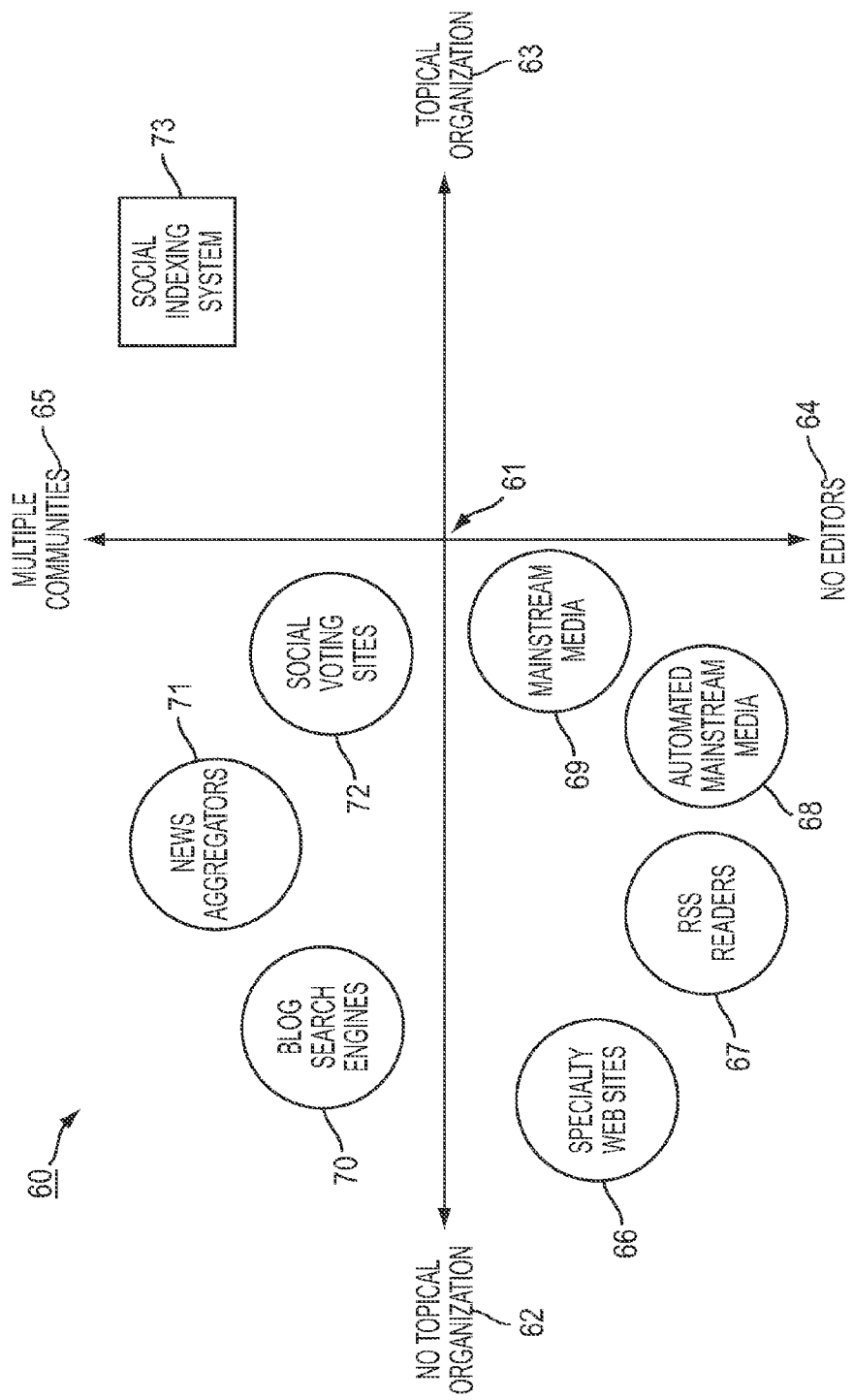
FIG. 5 is a graph showing, by way of example, the current organizational landscape of providers of digital information.

Prospecting relevant and authoritative digital information from outside a set of core topics to meet a user's information diet is important. Although all manner of data is widely available online, "raw" digital information obtained directly from a source generally lacks a comprehensive organizational scheme and competent ranking methodology. FIG. 5 is a graph 60 showing, by way of example, the current organizational landscape of providers of digital information. The bidirectional x-axis represents degree of topical organization of digital information and the bidirectional y-axis represents the amount of critical review, that is, "vetting." Information at the far left 62 of the x-axis lacks cohesive topical organization and refers to a single subject area. Under conventional approaches, the information is fairly static and organization is limited to a few topics. Information at the far right 63 of the x-axis enjoys a fine-grained and rich topical organization and covers multiple subject areas. Each subject area is deeply organized into many subtopics.

The y-axis characterizes the amount of expertise and labor that is used for "vetting" and ranking articles. No editing is performed on articles at the bottom of the y-axis and the articles are presented without any vetting. Closer to the origin 61, a small team of up to a few editors are engaged in vetting articles. Higher on the y-axis, a single community of people, "the light work of the many" and "the wisdom of the crowd," actively reads and votes on, or vets, articles. Multiple communities vet articles at the top of the y-axis, where each community focuses on a specific subject area.

At best, current approaches are coarsely organized and only lightly critically weighed, or "vetted." For instance, in the southwest quadrant, conventional organizational approaches use either a broad, coarse grained, or non-existent topical organization 62 with vetting by few or no editors 64. Specialty Web sites 66, such as Audiophilia, available at www.audiophilia.com, and hybridcars, available at www.hybridcars.com, serve narrow readership bases sheparded by a single dedicated editor with subject matter centered on a niche topic under which further topical organization is neither needed nor desired. RSS readers 67, such as Google reader, available at www.google.com/reader, automatically report new information under an automated feed on a dedicated topic. Similarly, automated mainstream media Web sites 68, such as Google news, available at news.google.com, use limited popular news categories under which information is automatically grouped without the need for an editor. The categorizing of articles, however, is limited by a very course grain, where the classification of articles in such broad categories can be done by selecting articles from single-topic sources, such as technology or sports news. Finally, mainstream media Web sites 69, such as the New York Times, available at www.nytimes.com, and c|net, available at www.cnet.com, employ individual editors or small teams of editors that organize news into popular news categories, which may include a wider scope to topics than available through automated mainstream media Web sites 68. The lack of community-based and presumptively impartial vetting, and the lack of fine-grained topic organization prevent these approaches from providing information covering a wide range of subject areas that is relevant to augmented communities that are interested in them, or to neighboring communities who may be interested in them.

In slight contrast, in the northwest quadrant, current approaches also use either a broad, coarse grained, or non-existent topical organization 62 and offer vetting by individual or small communities of users 65. Blog search engines 70, such as Google blog search, available at googleblog.blogspot.com, and icerocket, available at www.icerocket.com, are Web search engines dedicated to blogs, but the blogs are passively searched without use of topical organization. News aggregators 71, such as Topix, available at www.topix.com, automatically collect news organized by zip code into broad, and usually popular, topic areas with limited community-based review. Finally, news Web sites with voting 72, such as Slashdot, available at www.slashdot.org, reddit, available at www.reddit.com, and digg, available at www.digg.com, offer slightly finer grained yet still relatively large topic categories with vetting by a single user community. Opening critical review to individual or small user communities increases impartiality and, therefore, user confidence in authoritativeness, but the similar lack of fine-grained topic organization prevents customized discovery of new relevant information. The northwest quadrant approaches are also limited to single user communities, as typified by the "techie-gamer" communities that frequent the Redditt and Digg Web sites, or, like the Topix Web site, have multiple communities, but do not have fine-grained topic coverage or diverse subject areas. Still, other approaches exist, such as Daylife, which has more topics than typical news Web sites, yet does not organize information into hierarchical topical indexes with fine-grained topics. Moreover, the site is not organized into communities with members and their indexes, nor can users define new communities.

In contrast to the foregoing conventional approaches, the approach described herein uses: (1) index training and extrapolation to enable the right-end of the x-axis, and (2) voting in multiple augmented communities to enable the top-end of the y-axis. The social indexing system 73 uniquely occupies the northeast quadrant by providing fine-grained topical organization 63 through evergreen indexes 49 in conjunction with vetting by multiple user communities 65. The social part refers to the human element in the process. This organizational approach and community-based vetting ensures that each user receives both relevant and authoritative information from both his home and select neighboring communities.

Evergreen Index Overview

An evergreen index identifies and relates materials along expert-chosen topical joints, which reflect the expert's point of view on behalf of his augmented community as to material that is important. An evergreen index embodies judgments of how people in the augmented community will use the information cited and reflects a subject matter expert's articulation of important topics and references to where the topics are discussed.

The division of information into fine-grained categories enables several capabilities, including providing the capability to segregate article votes into fine-grained topic groups, rather than just one or a few large subject area groups. This capability also enables the estimating of article quality on a fine grain, and provides meaningful comparison of articles within a topic. Absent this capability, the utility of voting is mainly for determining "most popular" stories. Long tail stories, that is, stories of narrow interest, essentially disappear from view. Another benefit of hierarchical topic organizations makes possible the ability to associate user-editable "wiki-like" commentary with each topic in a community. This ability provides a place for community discussion and summarization of each topic.

Figure 6:
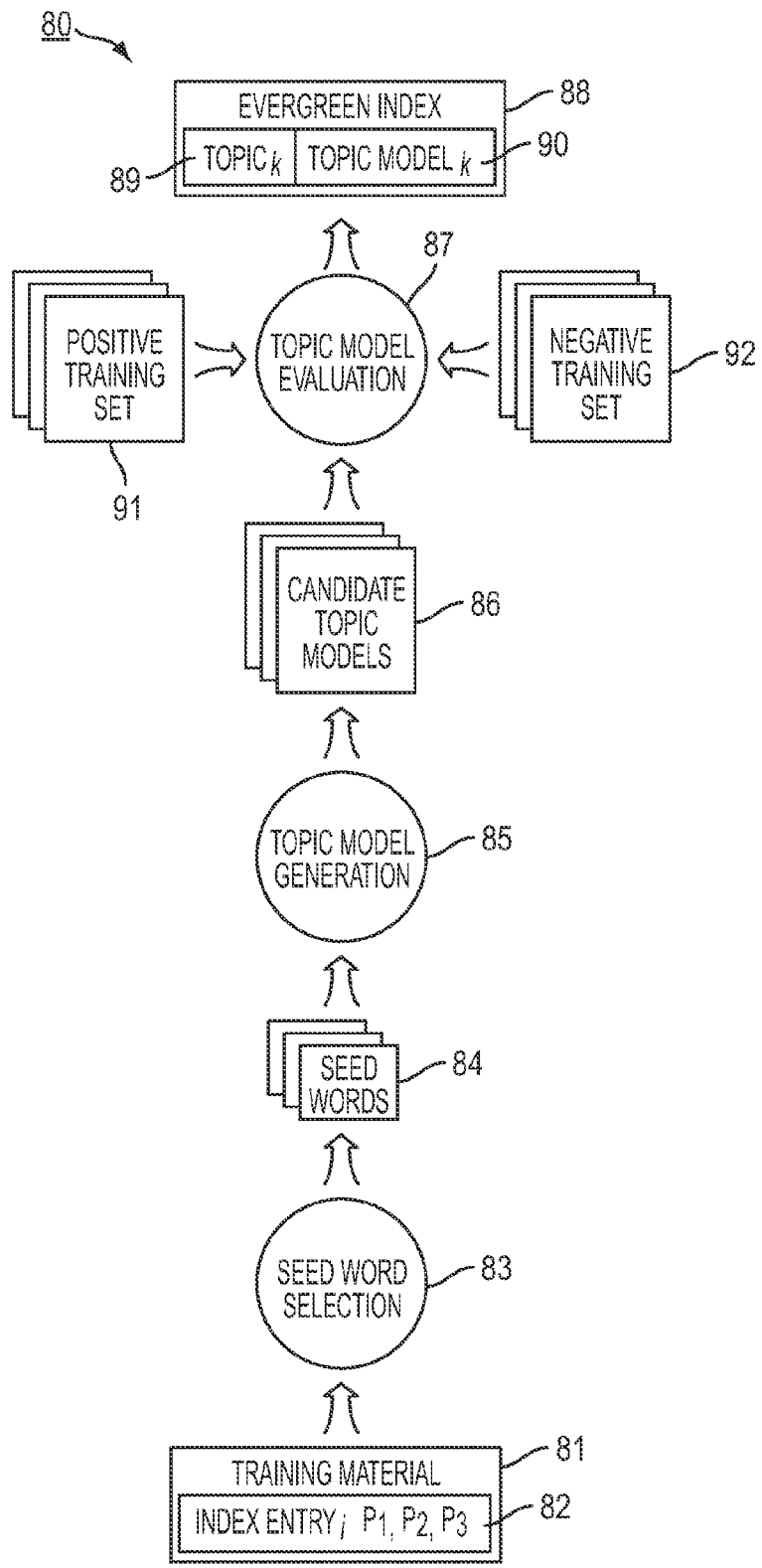
FIG. 6 is a data flow diagram showing an overview of evergreen index training.

An evergreen index is created through supervised machine learning and applied by index extrapolation, such as described in commonly-assigned U.S. patent application "System and Method for Performing Discovery of Digital Information in a Subject Area," Ser. No. 12/190,552, filed Aug. 12, 2008, pending, the disclosure of which is incorporated by reference. FIG. 6 is a data flow diagram showing an overview of evergreen index training. In brief, an evergreen index 88 is formed by pairing a topic or subtopic 89 with a topic model 90. The evergreen index 88 is trained by starting with a training index 81, which can be either a conventional index, such as for a book or hyperlinks to Web pages, or an existing evergreen index. For each index entry 82, seed words 84 are selected (operation 83) from the set of topics and subtopics in the training index 81. Candidate topic models 86, such as patterns, are generated (operation 85) from the seed words 84. The topic models transform direct page citations, such as found in a conventional index, into an expression that can be used to test whether a given text is on topic. Topic models can be specified as patterns as well as term vectors or any other form of testable expression. Finally, the candidate topic models 86 are evaluated (operation 87) against positive and negative training sets 91, 92. As the candidate topic models 86 are generated in order of increasing complexity and decreasing probability, the best candidate topic models 86 are usually generated first. By favoring simple or low complexity candidate topic models 86, the topic model evaluator follows the philosophy of Occam's razor to choose the simplest candidate topic models 86 that explain the data. Considerations of structural complexity are also helpful to avoid over-fitting in machine learning, especially when the training data is sparse.

The automatic categorization of new digital information using an evergreen index is a continual process. The topic models 90 in an evergreen index 88 enable new and relevant digital information to be automatically categorized by topic 89 through index extrapolation. Unlike a conventional index, an evergreen index 88 contains topic models 89 instead of citations, which enables the evergreen index 88 to function as a dynamic structure that is both untied to specific digital information and applicable over any digital information. New pages, articles, or other forms of digital information are identified, either automatically, such as through a Web crawler, or manually by the augmented community or others. The pages are matched against the topic models 90 of an evergreen index 88 to determine the topics or subtopics 89, which best fit the information. Not every document will find a correctly matching topic model 90. Some information may be wrongly matched, while other information may not be matched at all, yet still be worthy of addition to the evergreen index 88 as a new topic or subtopic 89.

Information Frontiers

Augmented communities can be arranged as a social network that expresses relationships among those communities within the network who are interested in related subject matter. FIG. 7 is a block diagram showing, by way of example, neighborhoods 100 of augmented communities. The neighboring augmented communities represent other fields of subject matter and groups of individuals sharing a common information interest.

Although each augmented community has its own evergreen index that focuses on a core subject matter, those augmented communities that focus on similar subject matter are topically related and appear closer on the information frontier of a home augmented community. For example, residents of a particular city, such as Palo Alto, Calif., could form an augmented community by creating their own evergreen index 103 to focus on newsworthy events concerning their city. Several cities and localities adjoin Palo Alto, including Stanford University, Menlo Park, East Palo Alto, and Mountain View. Their respective evergreen indexes 104a-d are topically related to the Palo Alto augmented community's evergreen index 103 and, by virtue of representing cities and localities physically adjacent to Palo Alto, collectively characterize an information frontier.

The selection of frontier augmented communities can be biased to favor those frontier communities that lie closer to the informational boundary of an augmented community. For example, Sunnyvale, Calif., is the next city south of Mountain View, so Sunnyvale's evergreen index 105 is at the closest edge of Mountain View's information frontier, yet is one degree of separation further from Palo Alto's information frontier. Thus, frontier information from closer frontier communities, such as Stanford University, would be favored as more closely related over the frontier information originating from more distant communities, like Sunnyvale.

In addition, the common behaviors of multiple frontier augmented communities could indirectly influence how frontier information is selected by a home augmented community. For instance, similarly strong ratings on articles about county taxation issues in the Menlo Park, East Palo Alto, and Mountain View communities could signal a topic of likely importance to the members of the Palo Alto augmented community. Thus, frontier information from frontier communities that has been selected through similar behaviors, such as strong and positive vetting, could be favored.

Together, Palo Alto, Stanford University, Menlo Park, East Palo Alto, Mountain View, and Sunnyvale form a social network 101a, which is topically related by local news of interest to mid-Peninsula Bay Area residents. These augmented communities commonly define reflective information frontiers at the community level. On a broader scale, other social networks 101b-d, respectively concerning wider ranging topics, such as medicine, baseball, and motorcycles, could also be within the universe of augmented communities and could more granularly define information frontiers at the individual community member level. More topically distant or even topically unrelated social networks 102a-b may also occupy the augmented community universe. These social networks 102a-b represent potential information frontiers where they play no active role in relating their respective core subject matter to the evergreen indexes of other social networks 101a-d or, more particularly, augmented communities 103, 104a-d, 105.

Digital Information Prospecting

Figure 8:
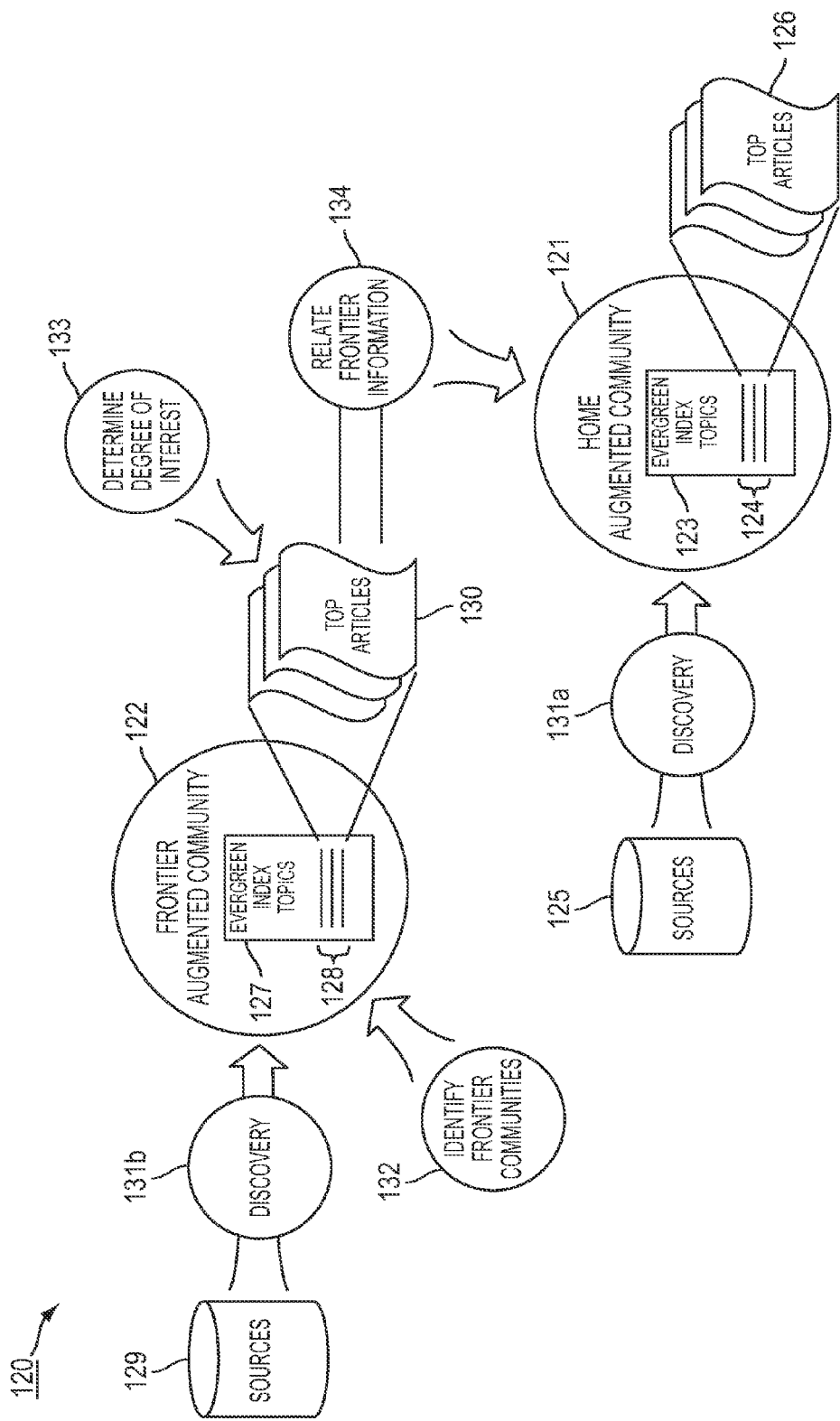
FIG. 8 is a data flow diagram showing a method for prospecting digital information in accordance with one embodiment.

An augmented community does not exist in a vacuum to the exclusion of all other augmented communities. Rather, an augmented community coexists with a social network of communities, some of which are more closely aligned with the augmented community's core interests, others that are not. Accordingly, digital information prospecting focuses on finding topically related augmented communities and leveraging their vetting of similar subject matter to the benefit of a home augmented community. FIG. 8 is a data flow diagram showing a method 120 for prospecting digital information in accordance with one embodiment. The method 120 is performed as a series of process steps by a server or other computing device.

An augmented community serves a social group whose members focus their collective attention on one or more core topics. Within the social network formed by related augmented communities, an individual's home augmented community 121 is characterized by an evergreen index 123, which lists those topics and subtopics 124 reflecting the community's core interests. Each frontier augmented community 122 is characterized by an evergreen index 127 of topics and subtopics 128 reflecting that community's core interests.

Each augmented community 121, 122 accesses an information source 125, 129, such as Web sites and feeds, and carves out an area of their own core interests through the topical models inherent in their respective evergreen indexes 123, 127. The evergreen indexes 123, 127 are populated through digital information discovery (operation 131a-b), such as described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference. Interrelatedness and overlapping of topical interests occurs along the informational boundaries of each augmented community, which constitutes an information frontier for a particular community.

Each augmented community 121, 122 vets information cited from the sources 125, 129 by voting within the topic or subtopic 124, 128 to which the information has been assigned and the top articles 126, 130 are thereby collectively determined. Information prospecting starts by first identifying frontier communities (operation 132), as further described below with reference to FIG. 9. A home augmented community 121 then capitalizes on the "the light work of the many" or "the wisdom of crowds" by determining the degree of interest afforded to frontier information in the frontier community's evergreen index 127, as further described below with reference to FIG. 10. The top articles 126, 130 are then shared by relating the frontier information with the home augmented community's own list of topics and subtopics 124 (operation 134), as further described below with reference to FIG. 11. Other operations are possible.

Identifying Frontier Augmented Communities

Figure 9:
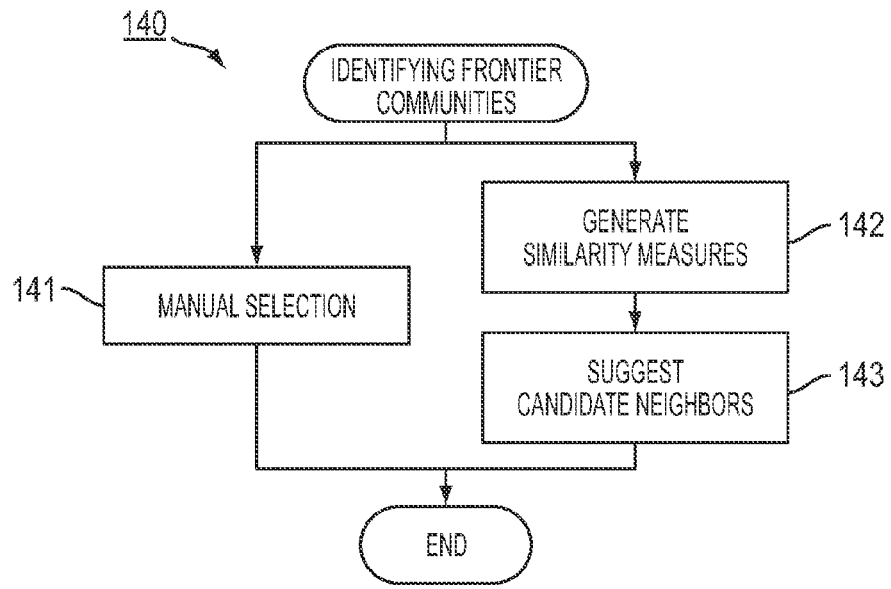
FIG. 9 is a flow diagram showing a routine for identifying frontier augmented communities for use with the method of FIG. 8.

Frontier information is considered important to an augmented community under the premise that members could benefit by becoming aware of related articles in other augmented communities. Initially, the frontier communities must be found. FIG. 9 is a flow diagram showing a routine 140 for identifying frontier augmented communities for use with the method 120 of FIG. 8. Frontier communities can be identified through manual selection (block 141) by knowledge domain experts, that is, the leaders of a home augmented community who are responsible for sheparding the topics of an evergreen index. Those augmented communities that the leaders deem to bear sufficient relatedness to a community's core interests are identified and explicitly connected as belonging on the community's information frontier.

Alternatively, frontier communities can be automatically selected by generating similarity measures (block 142) and suggesting candidate neighbor communities from among those communities exhibiting the strongest similarity (block 143). Similarly measures reflect potential overlap in the respective core interests of the communities within a social network. Overlap could be suggested by reliance on the same information sources or feeds, citation to the same articles, or the use of comparable topic models in their respective evergreen indexes. The similarity measures can be quantitative values reflecting concrete degrees of similarity or dissimilarity, quality measures evaluated along a continuum, or a combination of indicia. Candidate neighboring communities can be picked by applying the similarity measures against a minimum threshold, taking a fixed number of high rated candidate communities, or through similar selection process.

Determining Degree of Interest

Figure 10:
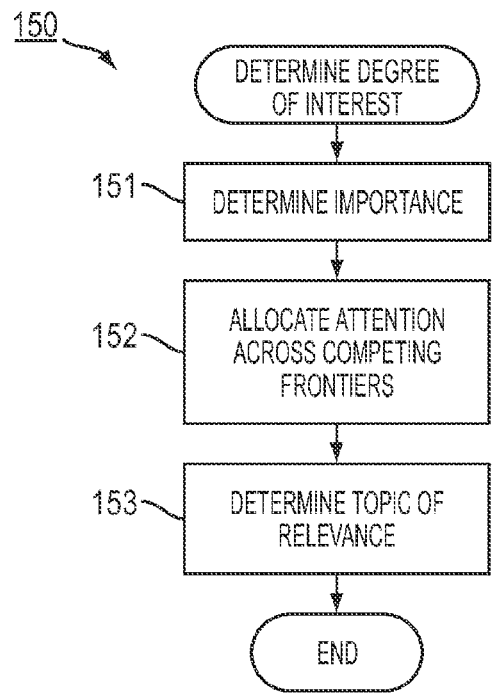
FIG. 10 is a flow diagram showing a routine for determining degree of interest for use with the method of FIG. 8.

The importance assigned by a frontier community to the information referenced in the community's evergreen index is a good indicator of an augmented community's likely receptivity to the same information. FIG. 10 is a flow diagram showing a routine 150 for determining degree of interest for use with the method 120 of FIG. 8. The frontier community first determines the importance of information cited into their evergreen index (block 151), which generally occurs through vetting, as described supra. The level of interest in a frontier community is used to select important new articles. In a further embodiment, the harvesting of frontier articles can be limited to certain parts of a topical taxonomy. The frontier community's ratings identify relevant articles and provide a preliminary estimate of degree of interest in the articles from the augmented community's evergreen index.

Next, attention across competing frontiers is allocated (block 152). The degree of separation from the frontier community is used to allocate attention across a set of frontier communities. In other words, stories arrive from multiple frontier communities. In the simplest approach, equal weight could be given to all frontiers. Alternatively, more attention could be afforded to some frontier communities over other frontiers by applying weighting. For instance, a distance metric could be determined to weigh the similarity of the frontier community to the augmented community, such as by observing the number of degrees of separation within the social network.

At this point, a set of articles and their topics from one or more frontiers have been selected and the articles need to be integrated into the home community Each topic of relevance is determined (block 153) by matching the articles against the patterns in the home communities. Where articles match no topics in a home community, articles are placed in a "news from the frontier" category with temporary subtopics borrowed from the frontiers. In a further embodiment, an augmented community leader could manually review the non-matching frontier information for potential consideration by the community, such as supplementing the topic models.

Relating Frontier Information

Figure 11:
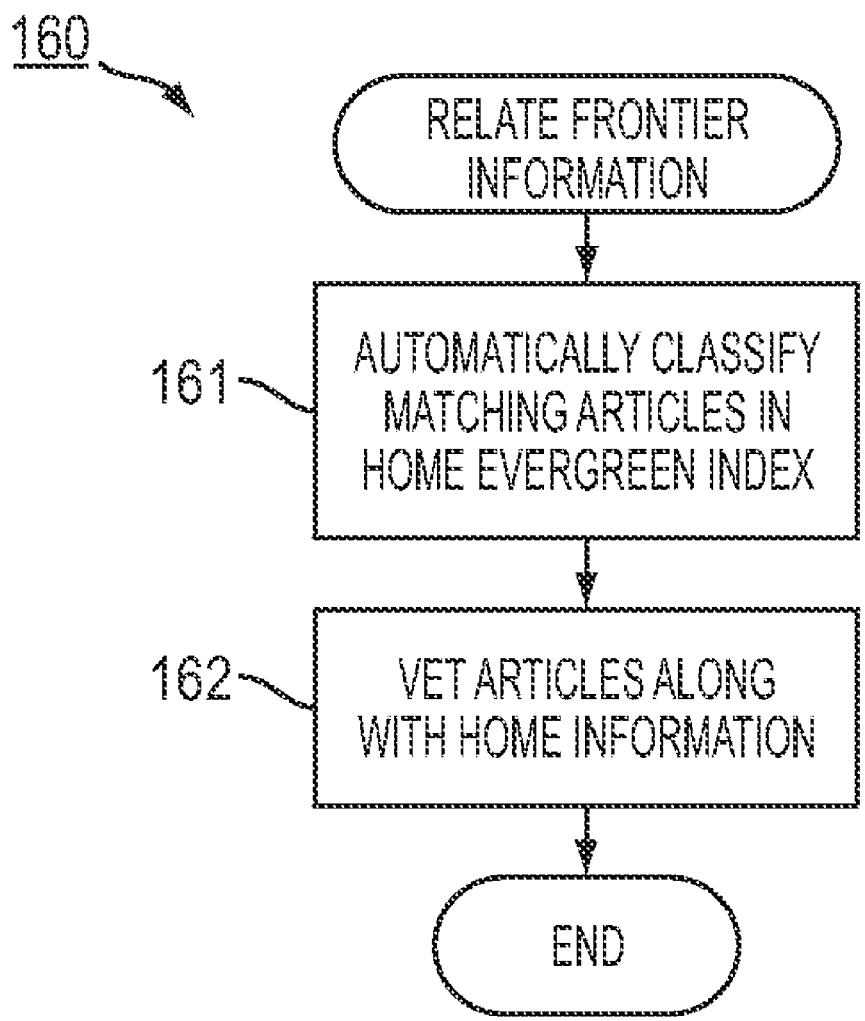
FIG. 11 is a flow diagram showing a routine for relating frontier information for use with the method of FIG. 8.

Information prospecting relies on the expertise of a frontier community to source and initially rate information. However, the augmented community's evergreen index is used to organize presentation of the information prospected. FIG. 11 is a flow diagram showing a routine 160 for relating frontier information for use with the method 120 of FIG. 8. Few articles from a frontier community will have universal appeal in an augmented community. Thus, the augmented community's evergreen index is used to automatically classify articles by the topics and subtopics matched (block 161). Thereafter, the matched articles are routed to the community's members according to their respective topics of interest and the frontier articles are vetted along with the regular information indexed into the home index (block 162). As members read the articles in their core topics, highly rated frontier articles on the same topic compete with home articles for display space. Poorly rated frontier information will receive less positive response, while highly rated frontier information will remain, thus widening the scope of the augmented community in line with new ideas or emerging trends.

User Interface

Information discovery in social indexing is the combination of index extrapolation with topic-delimited voting. Voting personifies the "light work of the many." Fine-grained categorization is crucial to voting because the categorization accounts for the assessment of the articles under each topic. Categorization ascertains which articles are the best and most worthy of the reader's attention. Voting is provided through a user interface that puts a face onto the evergreen index.

Figure 12:
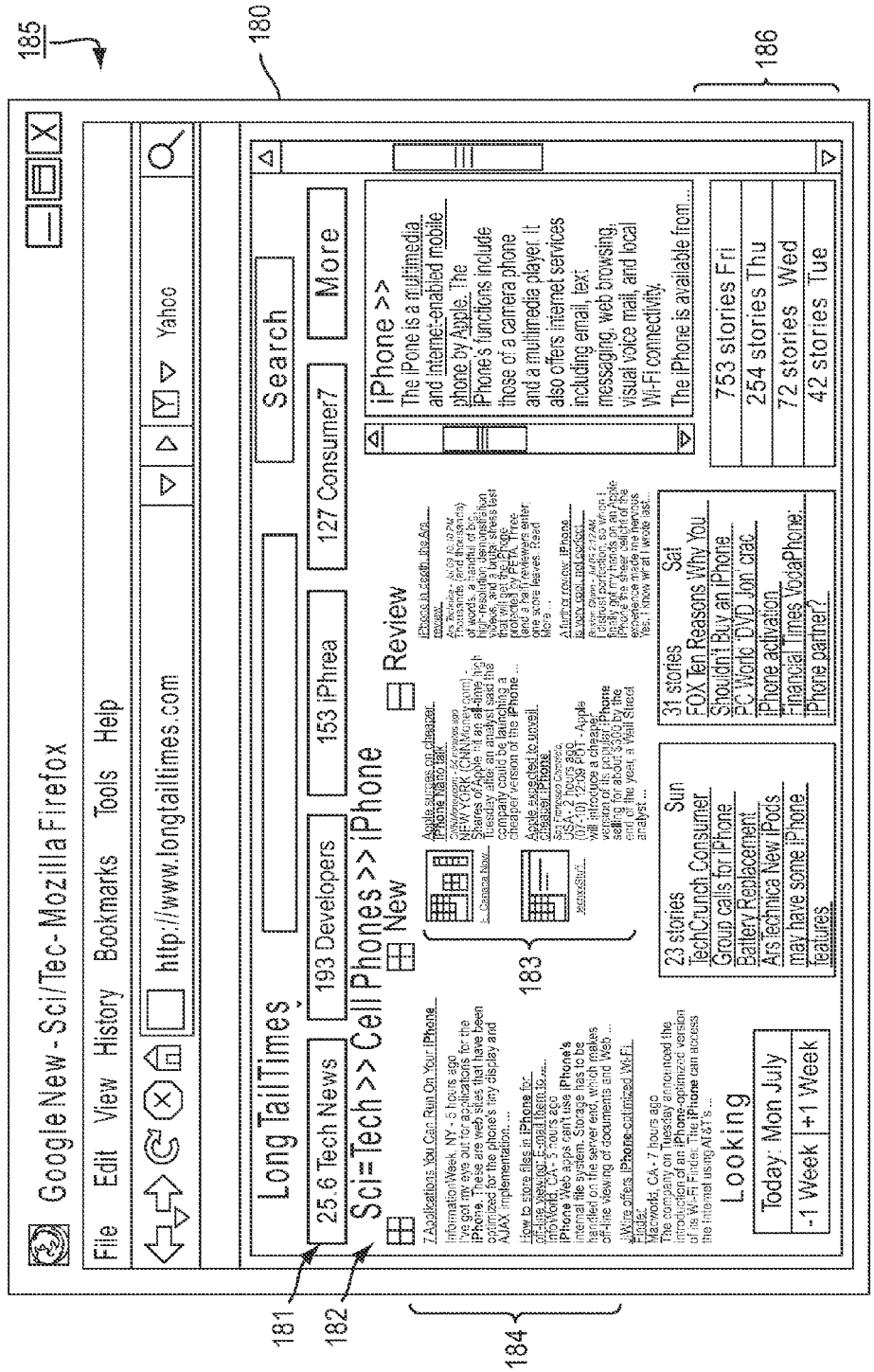
FIG. 12 is a screen shot diagram showing, by way of example, a user interface providing digital information organized by degree of interest.

Web browsers have become a ubiquitous and widely-adopted information provisioning interface, which provides an ideal, although non-exclusive, platform for spatially presenting new and relevant digital information. FIG. 12 is a screen shot diagram showing, by way of example, a user interface 180 providing digital information, including frontier information, organized by degree of interest. The user interface 180 brings together the two aspects of an information diet, relevancy and degree of interest, with voting. The user interface 180 provides an illustrative presentation, but other interfacing methodologies are equally possible.

The ratings of digital information voted by each augmented community can be provided on individual Web pages indexed by tabs 181 or other markers. Within each augmented community's tab, the topics and subtopics 182 of that augmented community can be listed first, with larger fonts or more prominent display attributes highlighting the most popular documents. The topics and subtopics 182 are selected from the augmented community's evergreen index and the documents are identified by matching a corpus of digital information against the topic models in the evergreen index, which can include digital information prospected from frontier communities, as described supra.

Degree of interest (DOI) refers to a numeric measure that is derived and intended to reflect how interesting some information will be. DOI can be determined relative to a particular article on a given topic, and can also be computed to relate a secondary topic to a primary one. DOI can be tailored to an individual based on information specific to the individual's history or state. When available, DOI can be used to optimize the presentation of information so that information with the highest DOI is favored, such as by giving the information more space or prominence. For instance, the highest ranked pages 183 can be allocated the largest amount of space with graphics, title, information regarding the source of the article, and abstract all provided. Other information or forms of visual or display emphasis could also be provided. Similarly, less highly rated pages 184 can be allocated less space, no graphics, and use smaller font sizes. Finally, lowest rated pages 185 can be relegated to the bottom of the tab with only the source and title of the page provided. Summarizations of the numbers of overall pages 186 can also be included as a convenience.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for prospecting digital information through online social communities, comprising:
a computer comprising a processor and memory within which code for execution by the processor is stored, comprising:
an information storage module configured to maintain a home evergreen index for a home community and a plurality of frontier evergreen indexes for respective frontier communities, the home evergreen index and the frontier evergreen indexes covering topically-limited subject areas, each of the subject areas comprising electronically-stored digital information, the home evergreen index and each frontier evergreen index comprising:
a hierarchy of stored topics; and
a stored topic model matched to each of the topics in the topic hierarchy, each of the topic models comprising a pattern evaluable against the digital information, wherein the pattern identifies such digital information matching the topic model's topic;
a frontier candidate identifier module configured to identify at least one frontier evergreen index that comprises stored topics that are at least partially distinct from the stored topics comprised in the home evergreen index;
a frontier candidate evaluation module configured to obtain vetted assessments as provided by the frontier community of the at least one frontier evergreen index for articles of the digital information identified by the patterns that comprise the topic models of the at least one frontier evergreen index;
a frontier integration module configured to select the articles of the digital information corresponding to the vetted assessments that are favorable and to match the patterns that comprise the topic models of the home evergreen index against the selected articles of the digital information; and
a display module configured to provide the selected articles of the digital information that were matched.

2. A system according to claim 1, further comprising:
a subject area evaluation module configured to compare the topically-limited subject areas of the home evergreen index to the respective topically-limited subject areas for a plurality of the frontier evergreen indexes; and
a frontier candidate selection module configured to select the at least one frontier evergreen index from the plurality of the frontier evergreen indexes based on domain-informed evaluation of the comparisons.

3. A system according to claim 1, further comprising:
a subject area evaluation module configured to compare the topically-limited subject areas of the home evergreen index to the respective topically-limited subject areas for a plurality of the frontier evergreen indexes;

an overlap evaluation module configured to determine overlap of the respective subject areas of the home evergreen index and the plurality of the frontier evergreen indexes; and a frontier candidate selection module configured to select the at least one frontier evergreen index from the plurality of the frontier evergreen indexes based on the overlap.

4. A system according to claim 1, further comprising:

a subject area evaluation module configured to compare the topically-limited subject areas of the home evergreen index to the respective topically-limited subject areas for a plurality of the frontier evergreen indexes;

a similarity evaluation module configured to determine similarity measures of the respective subject areas of the home evergreen index and the plurality of the frontier evergreen indexes; and a frontier candidate selection module configured to select the at least one frontier evergreen index from the plurality of the frontier evergreen indexes based on the similarity measures meeting at least one of a minimum threshold or up to a fixed number of the articles of the digital information.

5. A system according to claim 4, wherein the similarity measures comprise an amount of potential overlap in core interests of the home community and the frontier communities of the plurality of the frontier evergreen indexes.

6. A system according to claim 5, wherein the core interests comprise one or more of reliance on the same information sources or feeds, citation to the same articles, or the use of comparable topic models in the respective evergreen indexes.

7. A system according to claim 1, further comprising:

a subject area evaluation module configured to compare the topically-limited subject areas of the home evergreen index to the respective topically-limited subject areas for a plurality of the frontier evergreen indexes; and a frontier candidate suggestion module configured to provide the topic models from the plurality of the frontier evergreen indexes that corresponded to the topically-limited subject areas that did not match the topic models that corresponded to the topically-limited subject areas of the home evergreen index.

8. A system according to claim 7, further comprising:

a frontier candidate integration module configured to match the patterns that comprises the non-matching topic models against the digital information; and a results display module configured to provide the selected articles of the digital information that were matched.

9. A system according to claim 8, further comprising:

a home evergreen building module configured to add one or more of the non-matching topic models to the home evergreen index as selected by the home community.

10. A system according to claim 1, wherein the digital information comprises one or more of printed documents, Web pages, and material written in a digital media.

11. A computer-implemented method for prospecting digital information through online social communities, comprising:

maintaining a home evergreen index for a home community and a plurality of frontier evergreen indexes for respective frontier communities, the home evergreen index and the frontier evergreen indexes covering topically-limited subject areas, each of the subject areas comprising electronically-stored digital information, the home evergreen index and each frontier evergreen index comprising:

defining a hierarchy of stored topics; and matching a stored topic model to each of the topics in the topic hierarchy, each of the topic models comprising a pattern evaluable against the digital information, wherein the pattern identifies such digital information matching the topic model's topic;

identifying at least one frontier evergreen index that comprises stored topics that are at least partially distinct from the stored topics comprised in the home evergreen index;

obtaining vetted assessments as provided by the frontier community of the at least one frontier evergreen index for articles of the digital information identified by the patterns that comprise the topic models of the at least one frontier evergreen index;

selecting the articles of the digital information corresponding to the vetted assessments that are favorable and matching the patterns that comprise the topic models of the home evergreen index against the selected articles of the digital information; and providing the selected articles of the digital information that were matched on a display.

12. A method according to claim 11, further comprising:

comparing the topically-limited subject areas of the home evergreen index to the respective topically-limited subject areas for a plurality of the frontier evergreen indexes; and selecting the at least one frontier evergreen index from the plurality of the frontier evergreen indexes based on domain-informed evaluation of the comparisons.

13. A method according to claim 11, further comprising:

comparing the topically-limited subject areas of the home evergreen index to the respective topically-limited subject areas for a plurality of the frontier evergreen indexes;

determining overlap of the respective subject areas of the home evergreen index and the plurality of the frontier evergreen indexes; and selecting the at least one frontier evergreen index from the plurality of the frontier evergreen indexes based on the overlap.

14. A method according to claim 11, further comprising:

comparing the topically-limited subject areas of the home evergreen index to the respective topically-limited subject areas for a plurality of the frontier evergreen indexes;

determining similarity measures of the respective subject areas of the home evergreen index and the plurality of the frontier evergreen indexes; and selecting the at least one frontier evergreen index from the plurality of the frontier evergreen indexes based on the similarity measures meeting at least one of a minimum threshold or up to a fixed number of the articles of the digital information.

15. A method according to claim 14, wherein the similarity measures comprise an amount of potential overlap in core interests of the home community and the frontier communities of the plurality of the frontier evergreen indexes.

16. A method according to claim 15, wherein the core interests comprise one or more of reliance on the same information sources or feeds, citation to the same articles, or the use of comparable topic models in the respective evergreen indexes.

17. A method according to claim 11, further comprising:
comparing the topically-limited subject areas of the home evergreen index to the respective topically-limited subject areas for a plurality of the frontier evergreen indexes; and
providing the topic models from the plurality of the frontier evergreen indexes that corresponded to the topically-limited subject areas that did not match the topic models that corresponded to the topically-limited subject areas of the home evergreen index on the display.

18. A method according to claim 17, further comprising:
matching the patterns that comprises the non-matching topic models against the digital information; and
providing the selected articles of the digital information that were matched on the display.

19. A method according to claim 18, further comprising:
adding one or more of the non-matching topic models to the home evergreen index as selected by the home community.

20. A method according to claim 11, wherein the digital information comprises one or more of printed documents, Web pages, and material written in a digital media.

21. A computer-implemented apparatus for prospecting digital information through online social communities, comprising:
means for maintaining a home evergreen index for a home community and a plurality of frontier evergreen indexes for respective frontier communities, the home evergreen index and the frontier evergreen indexes covering topically-limited subject areas, each of the subject areas comprising electronically-stored digital information, the home evergreen index and each frontier evergreen index comprising:
means for defining a hierarchy of stored topics; and
means for matching a stored topic model to each of the topics in the topic hierarchy, each of the topic models comprising a pattern evaluable against the digital information, wherein the pattern identifies such digital information matching the topic model's topic;
means for identifying at least one frontier evergreen index that comprises stored topics that are at least partially distinct from the stored topics comprised in the home evergreen index;
means for obtaining vetted assessments as provided by the frontier community of the at least one frontier evergreen index for articles of the digital information identified by the patterns that comprise the topic models of the at least one frontier evergreen index;
means for selecting the articles of the digital information corresponding to the vetted assessments that are favorable and means for matching the patterns that comprise the topic models of the home evergreen index against the selected articles of the digital information; and
means for providing the selected articles of the digital information that were matched.

* * * * *